Sept. 20, 1955 J. JUNGWIRTH 2,718,408
ALL-UNIVERSAL TANDEM REAR ENDS FOR
TRUCKS, TRACTORS AND TRAILERS
Filed Sept. 5, 1950 2 Sheets-Sheet 2
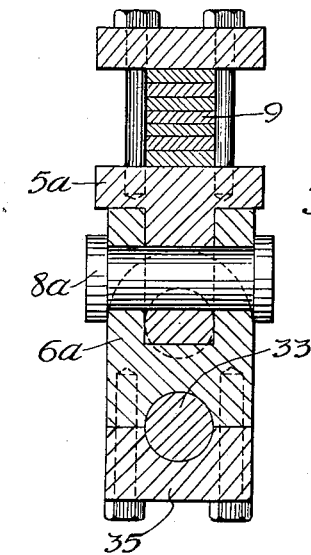
Fig. 3
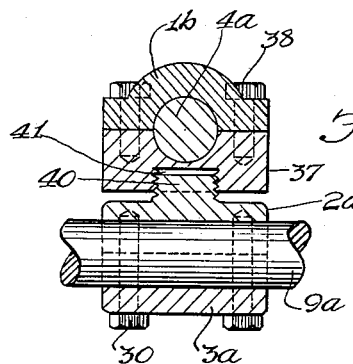
Fig. 4
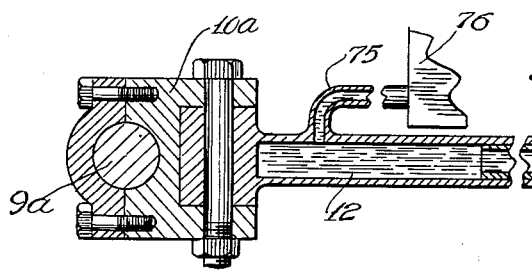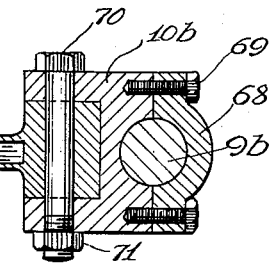
Fig. 5
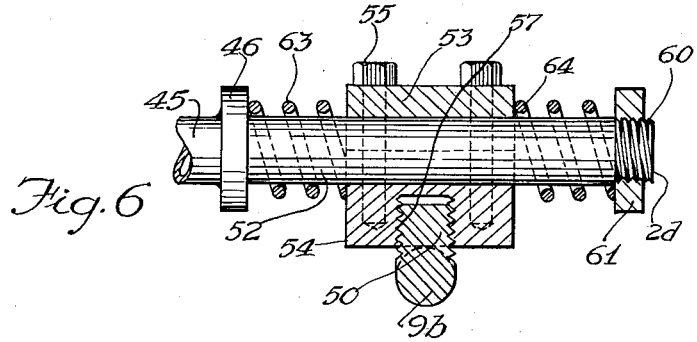
Fig. 6
Inventor:
John Jungwirth
By Milo B. Stevens &Co.
Attorneys.

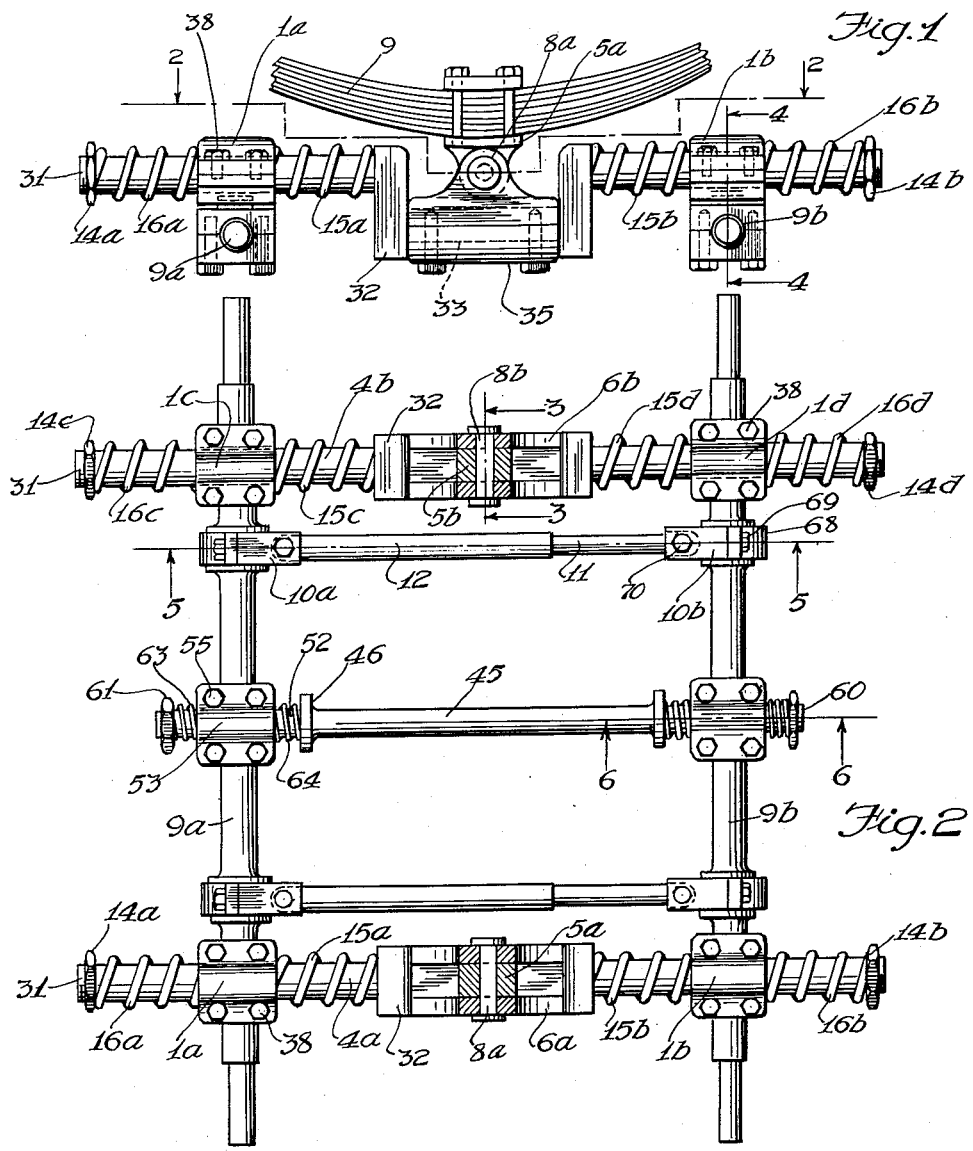

United States Patent Office 2,718,408
Patented Sept. 20, 1955

2,718,408

ALL-UNIVERSAL TANDEM REAR ENDS FOR TRUCKS, TRACTORS AND TRAILERS

John Jungwirth, Chicago, Ill.

Application September 5, 1950, Serial No. 183,137

10 Claims. (Cl. 280—104.5)

My invention relates to the structure covered in my Patent No. 2,523,954, dated September 26, 1950, and entails certain improvements over, and additions to, the said structure.

One object of the improved structure is to include a factor which relieves the springs of the vehicle of side strain or distortion in the event of lateral stress in the axle structure, so that such stress may not be transferred to the vehicle springs.

A further object is to strengthen the axle structure, and particularly the axles thereof, against rotary stresses when the vehicle brakes are applied.

Another object is to employ a central tie connection between the axles using springs for the absorption of direct shocks to the axles, and a set of distortion resisting side rods operating on the hydraulic principle.

An important object is to render certain units connecting the axle structure simpler and more rugged in order to reduce the cost of manufacturing the structure and enable it to withstand hard use.

With the above objects in view, and any others which may suggest themselves from the description to follow, a better understanding of the invention may be had by reference to the accompanying drawing, in which—

Fig. 1 is a side elevation of the structure;

Fig. 2 is a section on the line 2—2 of Fig. 1;

Fig. 3 is an enlarged section on the line 3—3 of Fig. 2;

Fig. 4 is an enlarged section on the line 4—4 of Fig. 1; and

Figs. 5 and 6 are enlarged sections on the lines 5—5 and 6—6 of Fig. 2, respectively.

In accordance with the foregoing, it may be stated that the improved structure is basically arranged similarly to the one in my aforesaid patent. Thus, the side beams of the structure are indicated as in the patent at 4a and 4b, while the axles thereof are indicated at 9a and 9b. As in the patent, the side beams and axles of the improved structure are connected at the corners by bearings 1a, 1b, 1c and 1d; and the springs carried by the side beam 4a are indicated at 16a, 15a, 15b and 16b, as before, while those carried by the side beam 4b are indicated at 16c, 15c, 15d and 16d. However, the ends of the side beams are now threaded, as indicated at 31, to receive securing nuts 14a, 14b, 14c and 14d instead of the collars previously marked with these numbers. Further, instead of the bearings 7a and 7b previously mounted on the center portions of the side beams, these are formed with downward cranks 32, the shaft portions 33 of these receiving bearings 35 built up with the receptacles 6a and 6b which receive the pivot pins 8a and 8b for the spring seats 5a and 5b. The inner springs 15a, 15b, 15c and 15d therefore bear inwardly against the cranks 32 instead of the bearings 7a and 7b previously employed.

In the patented structure, the corner bearings employed superimposed blocks 2a and 3a at one corner, 2b and 3b at the next corner, etc., to receive the end portions of the axles 9a and 9b; and a rotary joint was involved between the bearing 1a and the block 2a involving a bolt and other details, such structure being duplicated between the parts 1b and 2b, etc. In the present instance, reference to Fig. 4 shows a simplification of this arrangement. Thus, the blocks 2a and 3a are shown receiving the axle, as before, with the bolts 30 securing the blocks to the axle. However, the bearing 1a is secured to a base 37 by a set of bolts 38 in order to make the bearing fast to the side beam 4a; and the block 2a is extended upwardly with a short but massive screw 40 which enters a tapped bore 41 in the base 37 of the bearing 1a, the fit of the screw being sufficiently tight for a firm or solid connection between the joined parts, while permitting a limited turning movement between them.

The braking stress of the vehicle imposes a tendency for the axles to turn, and means are now provided in the forms of a torque tube 45 to overcome this tendency. This tube is located midway between the side beams 4a and 4b, and is formed with collars 46 at points inwardly of the axles 9a and 9b.

In order to receive the torque tube 45, the axles 9a and 9b are extended upwardly with screws 50, these being preferably attached by welding. The outer portions 52 of the torque tube pass freely through bearings 53, these having bottom blocks 54 to which they are secured by bolts 55; and the bottom blocks are tapped from the bottom as indicated at 57 to receive the screws 50 with a snug but rotatable fit, like that of the screws 40 described above. The outer portions 52 of the torque tube terminate in threaded form, as indicated at 60, to receive securing nuts 61; and compression springs 63 and 64 are mounted on the tube portions 52 between the bearings 53 and the collars 46, and between such bearings and the nuts 61, respectively.

In the aforesaid patent, a tie connection was applied between the axles 9a and 9b in the form of clips 10a and 10b receiving a rod 11 telescoped in a tube 12. In the present instance, the clips are clamped to the axles instead of welded, receiving jaws 68 from the outside secured by bolts 69. Further, the pins 13a and 13b are now replaced by sturdy bolts 70 which receive securing nuts 71 at their lower ends. Further, the springs 17 and 18 of the former structure are now eliminated, and the rod 11 made tubular, as indicated at 73. An outlet 75 from the tube 12 is now led to a chamber 76, with the rod 73, tube 12, outlet 75 and chamber 76 containing an elastic fluid to replace the springs 17 and 18.

The merits of the improved features will now be explained. It will be recalled that the turning of the vehicle was said to impose lateral stresses on the side beams 4a, and 4b, which in the previous structure were transferred to the vehicle springs 9 for absorption. It is now apparent that the provision of the crank 32 enables the side beams to move laterally independently of the vehicle springs by simply pivoting in the bearings 35, so that only the usual vertical stresses are imposed on the vehicle springs. Further, the pivotal connection formed by the screws 40 is of exceeding simplicity, making the structure of the bearings 1a, 1b, etc., simple; and it is conceivable that the screws may be made so massive as to form solid connections between the bearings and the axles while allowing a limited amount of rotary movement between them. Further, the torque tube 45 is applied in longitudinally yieldable relation to the axles of the structure by means of the springs 63—64, these being under compression when installed; and the screw joint between the axles and the torque tube bearings 53 may be made sufficiently strong to enable the torque tube to resist turning stresses in the axles due to braking effort. Further, the hydraulic time means illustrated in Fig. 5 are of a nature to be more economically applied to the axles than in the former instance; and the shocks between the axles and the strains of their convergence when the vehicle is making a turn are now absorbed by the hydraulic medium in the tubes 73 and 12. An improved structure is thus had which reduces the chances of undue strain caused by turning movements of the vehicle, while including units which are simplified in construction and of a character to materially reduce the cost of the structure.

I claim:

1. A tandem axle unit for vehicles carrying a laterally-spaced pair of supporting springs, comprising a pair of axles, fore-and-aft universal bearings carried by the end portions thereof, and a longitudinal beam slidably disposed in the bearings of each side, each of said universal bearings comprising a member carried by an axle and extended upwardly with a screw, and a co-acting member carried by the beam and tapped in the underside to receive said screw in semi-tight relation.

2. A tandem axle unit for vehicles carrying a pair of laterally-spaced supporting springs comprising a pair of axles, side beams carried by the axles below the vehicle springs, and supports for the springs carried by the related side beams, said supports including pivot means allowing transverse movements of the side beams relative to the springs.

3. The structure of claim 2, said pivot means comprising crank shafts, and bearings carried by the springs and journaled on said crank shafts.

4. The structure of claim 2, said pivot means comprising underslung crank shafts, and bearings carried by the springs and journaled on said crank shafts.

5. A tandem axle unit for vehicles carrying a pair of laterally-spaced supporting springs comprising a pair of axles, side beams carried by the axles below the vehicle springs, and longitudinal supports for the springs carried by the related side beams, said supports including longitudinal pivot means allowing transverse movements of the side beams relative to the springs, seats for the latter, and transverse pivots between said means and the spring seats.

6. A tandem axle unit for vehicles carrying a laterally-spaced pair of supporting springs, comprising a pair of axles, fore-and-aft universal bearings carried by the end portions thereof, a longitudinal beam slidably disposed in the bearings on each side, an intermediate torque tube with terminal portions spacedly crossing the axles, and intermediate bearings carried by the latter and journaling said terminal portions.

7. A tandem axle unit for vehicles carrying a laterally-spaced pair of supporting springs, comprising a pair of axles, fore-and-aft universal bearings carried by the end portions thereof, a longitudinal beam slidably disposed in the bearings on each side, an intermediate torque tube with terminal portions spacedly crossing the axles, intermediate bearings carried by the latter and journaling said terminal portions, enlargements formed in each terminal portion on opposite side of the intermediate bearing, and yieldable means interposed between the latter and the enlargements.

8. A tandem axle unit for vehicles carrying a laterally-spaced pair of supporting springs, comprising a pair of axles, fore-and-aft universal bearings carried by the end portions thereof, a longitudinal beam slidably disposed in the bearings on each side, an intermediate torque tube with terminal portions spacedly crossing the axles, intermediate bearings carried by the latter and journaling said terminal portions, enlargements formed in each terminal portion on opposite side of the intermediate bearing, and compression springs interposed between the latter and the enlargements.

9. A tandem axle unit for vehicles carrying a laterally-spaced pair of supporting springs, comprising a pair of axles, fore-and-aft universal bearings carried by the end portions thereof, a longitudinal beam slidably disposed in the bearings on each side, an intermediate torque tube with terminal portions spacedly crossing the axles, intermediate bearings carried by the latter and journaling said terminal portions, collars formed on said terminal portions in inwardly spaced relation from said intermediate bearings, endwise screw formations on the terminal portions spaced outwardly from the intermediate bearings, nuts mounted on such formations, and compression springs mounted on said terminal portions between the intemediate bearings and said collars and nuts, respectively.

10. A tandem axle unit for vehicles carrying a laterally-spaced pair of supporting springs, comprising a pair of axles, fore-and-aft universal bearings carried by the end portions thereof, a longitudinal beam slidably disposed in the bearings on each side, an intermediate torque tube with terminal portions spacedly crossing the axles, intermediate bearings carried by the latter and journaling said terminal portions, and a connection between the axles and the intermediate bearings in the form of an upward screw extended from each axle and a tapped bore in the underside of the related intermediate bearing and receiving said screw in semi-tight relation.

References Cited in the file of this patent

UNITED STATES PATENTS

| | | |
|---|---|---|
| 2,193,567 | Pointer | Mar. 12, 1940 |
| 2,456,719 | Martin | Dec. 21, 1948 |
| 2,523,954 | Jungwirth | Sept. 26, 1950 |
| 2,575,065 | Merry | Nov. 13, 1951 |

FOREIGN PATENTS

| | | |
|---|---|---|
| 704,811 | France | Feb. 24, 1931 |